United States Patent [19]

Fitko, deceased

[11] 4,304,804
[45] Dec. 8, 1981

[54] METAL CONTAINER COATINGS HAVING A REDUCED TENDENCY TO ABSORB ODORS

[75] Inventor: Chester W. Fitko, deceased, late of Chicago, Ill., by Clare B. Fitko, administrator

[73] Assignee: The Continental Group, Inc., Stamford, Conn.

[21] Appl. No.: 124,361

[22] Filed: Feb. 25, 1980

Related U.S. Application Data

[63] Continuation of Ser. No. 943,418, Sep. 18, 1978, abandoned.

[51] Int. Cl.³ .................... B32B 15/08; B32B 27/36; B32B 27/38
[52] U.S. Cl. .................... 428/35; 220/458; 260/29.2 EP; 260/29.2 E; 428/418; 428/458; 525/438; 525/449
[58] Field of Search ................... 428/35, 418; 260/29.2 EP, 29.2 E; 220/458; 525/449, 438

[56] References Cited

U.S. PATENT DOCUMENTS

| | | | |
|---|---|---|---|
| 3,070,256 | 12/1962 | Bremmer | 428/35 |
| 3,650,997 | 3/1972 | Weisfeld | 428/418 |
| 3,908,049 | 9/1975 | Fitko | 428/35 |
| 3,908,050 | 9/1975 | Gor | 428/35 |
| 4,098,735 | 7/1978 | Tobias | 428/418 |

Primary Examiner—Ellis P. Robinson
Attorney, Agent, or Firm—Paul Shapiro

[57] ABSTRACT

Metal containers are internally coated with a coating composition having a reduced tendency to absorb odor which deleteriously affect comestibles packaged therein, the coating being an aqueous dispersion of a vehicle comprised of a combination of heat curable thermosetting aromatic polyepoxide resin and a carboxyl containing polyester resin prepared from an aromatic polyepoxide and a mixture of polycarboxylic acids comprised of a major amount of an aliphatic dicarboxylic acid and a minor amount of an aromatic tricarboxylic acid.

4 Claims, No Drawings

METAL CONTAINER COATINGS HAVING A REDUCED TENDENCY TO ABSORB ODORS

This is a continuation of Ser. No. 943,418, filed Sept. 18, 1978, now abandoned.

TECHNICAL FIELD

This invention relates to coating metal containers and more particularly to coating metal containers using an aqueous dispersion of a carboxyl containing polyester resin.

BACKGROUND ART

In metal container manufacture, after the can body is completely configurated and decorated, but before the end is assembled onto the body, the interior surface of the can body is coated with a protective coating of a synthetic resin material.

It has been the conventional practice in the metal container industry to apply, as the coating material, a heat hardenable resin mixed in a volatile organic solvent which is sprayed into the open end of the container body and onto the interior walls thereof. The wet coated container is then passed through an oven in which hot air is circulated to evaporate the solvent and harden the coating.

Although organic solvent based resin coatings are widely used in the manufacture of metal food and beverage containers, one drawback to the use of these coating systems is that in the step of heat hardening the resin coating material, the solvent with which it is mixed is driven off and exhausted into the atmosphere, thereby giving rise to an atmospheric pollution problem. Within the last few years there has been a great deal of attention to atmospheric pollution and the atmospheric contamination which results from industrial exhaust. One of the contaminants at which attention is now directed is the solvent exhausted from the curing ovens of metal container manufacturers.

One method of avoiding the air pollution problem associated with organic solvent based coatings that has been considered by container manufacturers is to substitute an aqueous dispersion medium for the organic solvent presently used. Water dilutable acrylic resins, especially epoxy cured acrylic resins, have been considered as aqueous dispersible materials for coating metal containers but have the drawback that the coating material readily absorbs various odors from its surroundings. After packaging liquid comestibles such as beer in containers internally coated with epoxy cured acrylic resin based coatings, the odors are released into the beer, and the delicate flavor of the beer is deleteriously affected.

DISCLOSURE OF THE INVENTION

In accordance with the present invention, there is provided dispersed in an aqueous medium, a coating composition for application to metal surfaces to provide an adherent coating film which has a reduced tendency to absorb odors from its surroundings, the coating being comprised of (1) a carboxyl containing polyester resin prepared by reacting an an aromatic polyepoxide with a stoichiometric excess of a mixture of (a) a major amount of an aliphatic dicarboxylic acid having 4 to 10 carbon atoms in combination with (b) a minor amount of an aromatic tricarboxylic acid or anhydride and (2) a heat curable, thermosetting aromatic polyepoxide.

As will hereinafter be illustrated, the aqueous coating compositions of the present invention provide a coating film having very low odor absorption when applied to metal, e.g., aluminum and steel containers used for packaging carbonated beverages.

BEST MODE FOR CARRYING OUT THE INVENTION

The aliphatic dicarboxylic acid used in the practice of the present invention is a dicarboxylic acid having 4 to 10 carbon atoms as for example, succinic acid, adipic acid, suberic acid, azelaic acid and sebacic acid, adipic acid being preferred.

Illustrative of aromatic tricarboxylic acids useful in the practice of the present invention include trimellitic acid and its anhydride as well as the acids and anhydrides of the alkyl (1-4 carbon) and halogen substituted aromatic tricarboxylic acids.

The term "aromatic polyepoxides" as used herein means the glycidyl ethers of polyhydric phenols, i.e., the polymeric reaction products of polyhydric mono and polynuclear phenols with polyfunctional halohydrins and/or glycerol dichlorohydrin. Polyepoxides of this type are disclosed in the Greenlee patents, U.S. Pat. Nos. 2,585,115 and 2,589,245. In addition, many of these resins are commercially available products. Typical polyhydroxy phenols useful in the preparation of aromatic polyepoxides include resorcinol and various diphenols resulting from the condensation of phenol with aldehydes and ketones such as formaldehyde, acetaldehyde, acetone, methyl ethyl ketone and the like. A typical aromatic polyepoxide is the reaction product of epichlorohydrin and 2,2-bis(p-hydroxy phenyl) propane (Bisphenol A), the resin having the following structural formula:

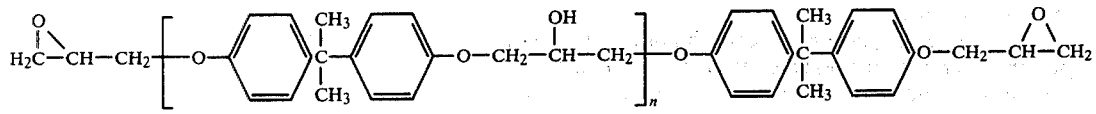

wherein n is zero or an integer up to 10. Generally speaking, n is no greater than 2 or 3 and is preferably 1 or less.

In EPON 828, an aromatic polyepoxide of the type above described and commercially available from the Shell Chemical Company, n is 0 to 1.

In preparing the carboxyl containing polyester resin used in the practice of the present invention it is an essential and critical feature of the present invention that the aliphatic dicarboxylic acid be used in major amounts to prepare the polyester. The term "major amount" when used in the present specification means about 90 to about 92 percent by weight based on the total weight of the acid components used to prepare the polyester resin. Thus, the acid component that is reacted with the aromatic polyepoxide to prepare compositions of the present invention is generally comprised of about 8.0 to about 9.5 percent by weight of the aromatic tricarboxylic acids and about 90.5 to about 92 percent by weight of the aliphatic dicarboxylic acid. If more than the above stated proportions of the aliphatic dicarboxylic acid is used in the preparation of the polyester resin, the resulting cured coating film when applied to metal surfaces exhibits poor water resistance, i.e., "blushes", when exposed to pasteurization conditions. If less than the above stated proportion of the aliphatic dicarboxylic acid is used in the preparation of the polyester resin, the viscosity of the resulting resin is too high for coating application using commercial procedures.

The carboxyl containing polyesters of the present invention are prepared in a one-stage reaction wherein the aromatic polyepoxide and the mixture of aromatic and aliphatic acids are reacted at a temperature of 80° to 120° C. in the presence of a suitable esterification catalyst such as benzyldimethyl amine. A stoichiometric excess of the carboxylic acid mixture is required to react with the aromatic polyepoxide to prepare the carboxyl containing polyester resin. In preparing the polyester resin, the mole ratio of polyepoxide to polycarboxylic acid generally ranges from about 0.6:1 to 0.9:1.

The reaction between the polycarboxylic acids and the aromatic polyepoxide is preferably conducted in the presence of a diluent such as methyl ethyl ketone. The esterification reaction is continued until analysis indicates that the acid number of the reaction mixture which is initially about 280 has been reduced to 60 to 80. Acid number is defined as the number of milligrams of potassium hydroxide required to neutralize the free acidity of 1 gram of non-volatile material under the conditions of the test.

The esterification reaction is generally conducted at atmospheric pressure. The time of the reaction is not critical although an acid number of 60–80 is generally reached in a period of 10 to 30 hours of heating.

Heat curable thermosetting polyepoxide resins which can be employed in the practice of the present invention to prepare heat hardenable coatings when admixed with the carboxyl containing polyester resins include aromatic polyepoxide resins, such as EPON 828, which are also used for the preparation of the carboxylic containing polyester resin.

The aqueous dispersions used in the practice of the present invention are prepared by admixing the thermosetting aromatic polyepoxide resin with the carboxyl containing polyester resin and then stirring the admixture at 45°–65° C. for 0.5 to 4 hours. Thereafter, the admixture is dispersed in water containing a minor amount of an alkaline material such as ammonia, ammonium hydroxide or a tertiary amine compound such as dimethyl-aminomethyl propanol to effect dispersion of the solid components.

The solids content coating compositions of the present invention are comprised of about 70 to about 95 percent by weight and preferably about 80 to 90 percent by weight of the carboxyl containing polyester resin and about 5 to about 30 percent by weight and preferably about 10 to 20 percent by weight of the heat curable thermosetting aromatic polyepoxide resin.

The aqueous coating compositions of the present invention can be satisfactorily applied at a vehicle solids content ranging from about 10 to about 40 percent by weight, based on the total weight of the aqueous dispersion. Generally, a solids content of 10 to 20 percent by weight is preferred.

The aqueous coating compositions of the present invention containing the carboxyl containing polyester/thermosetting aromatic polyepoxide resin vehicle can be satisfactorily applied by any of the conventional methods employed by the coating industry. However, for coating the inner walls of metal containers, spray coating is the preferred method. For general coating purposes, roll and flow coating are also useful methods of application.

After applying the aqueous coating dispersion, the applied coating is cured by heating the coated metal substrate at a temperature of about 300° F. to about 450° F. for a period of about 2 minutes to 10 minutes.

The preferred coating weight for coating metal container bodies with an adequately protective coating is in the range of 0.5 to 10.0 milligrams of resin coating per square inch of exposed metal surface. To obtain this coating weight, the aqueous resin dispersion is applied at a coating thickness of about 1.0 to 3.0 mils.

INDUSTRIAL APPLICABILITY

The present invention is illustrated but not limited by the following Example.

To a three liter three-necked reaction flask equipped with a magnetic stirrer, condenser and water trap were added 133.0 grams EPON 828, 6.4 grams trimellitic anhydride, 65.7 grams adipic acid, 0.5 grams benzyldimethylamine and 50 grams methyl ethyl ketone. The temperature of the charged reaction flask was raised to 94° C.–102° C. at which temperature the mixture was at reflux. When about 12 hours had elapsed, the acid number was determined to be 75.0 indicating that a carboxyl containing polyester had been obtained.

A coating composition was prepared from an admixture of 100 grams of carboxyl containing polyester prepared in the Example and 11.0 grams of EPON 828 dissolved in 10 grams of butyl cellosolve. The admixture was stirred for 1–2 hours at 50° to 55° C. The admixture was then diluted with an aqueous ammonia solution containing 8.0 grams aqua ammonia (28%) and 1000 grams deionized water.

The pH of the admixture was adjusted with aqueous ammonia solution to pH 6.8–7.2.

The aqueous dispersion prepared above was relatively clear and when measured for viscosity with a Zahn No. 2 cup the viscosity was 18 seconds.

The aqueous coating dispersion was sprayed onto the interior wall surfaces of 24 cans at a thickness of 1–2 milligrams per square inch of wall surface and then baked 10 minutes in an oven at 390° F. The cured, hardened coating was found to be a tough, adherent, blush free, water resistant film when exposed to pasteurization conditions, i.e., 140° F. for 19 minutes.

The coating was evaluated for odor pick-up by the following odor sorption test:

Odor Sorption Test

The odor sorption test is designed to measure qualitatively the extent of odors that a coating will absorb from its surroundings. In this test, twelve can body blanks which were externally coated with a foul smelling white coating were corrugated and placed in a five gallon container.

Cans which were internally coated with the coatings of the Example were placed over the body blanks in the container. For purposes of comparison, cans internally coated with an epoxy/acrylic resin based coating were also placed over these body blanks in the container. After placement of the cans, the five gallon container was covered with aluminum foil and stored at 100° F. for three days. Thereafter, the cans were packed with beer. After two days at room temperature, the beer packaged in these cans was flavor tested by a panel of 10 people.

The flavor of the beer packed in containers internally coated with the coatings of the Example was compared with that packed with the comparative epoxy/acrylic resin coating. The flavor was rated from 0 to 5. The higher the rating, the more off-taste is the beer. A rating of 4 or more indicates that beer has unacceptable taste.

The following are the results of the odor sorption test:

|  | Flavor Rating |
|---|---|
| Cans coated with coating of Example | 0-2 |
| Comparative Epoxy/acrylic coating | 4-5 |

The results recorded above indicate that coating compositions of the present invention exhibit a reduced tendency to absorb odors from their surroundings, especially when contrasted to epoxy/acrylic polymer based coatings.

What is claimed is:

1. An aqueous coating dispersion composition for forming films having a reduced tendency to absorb odors from its surroundings, said composition comprised of a (1) a vehicle dispersed in water, the vehicle solid content ranging from about 10 to about 40% by weight based on the total weight of the aqueous dispersion, the vehicle being comprised of an admixture of
   a. about 70 to 95 percent by weight of a carboxyl containing polyester resin having an acid number between about 60 and about 80 and
   b. about 5 to 30 percent by weight of a heat curable aromatic polyepoxide thermosetting resin, the carboxyl containing polyester being the reaction product of
      i. an aromatic polyepoxide
      ii. a stoichiometric excess of a mixture of polycarboxylic acids consisting essentially of about 8.0 to about 9.5 percent by weight of at least one aromatic tricarboxylic acid and 90.5 to 92 percent by weight of an aliphatic dicarboxylic acid having 4 to 10 carbon atoms, and (2) an amount of an alkaline material sufficient to effect dispersion of the admixture.

2. The composition of claim 1 wherein the mixture of polycarboxylic acids is comprised of trimellitic anhydride and adipic acid.

3. The composition of claim 1 wherein the aromatic polyepoxide is the reaction product of epichlorohydrin and 2,2-bis(p-hydroxy phenyl) propane.

4. A method container internally coated with the composition of claim 1.

* * * * *